G. S. WHITAKER.
DENTAL RETAINER AND PROCESS OF MAKING SAME.
APPLICATION FILED SEPT. 30, 1915.
1,253,654. Patented Jan. 15, 1918.
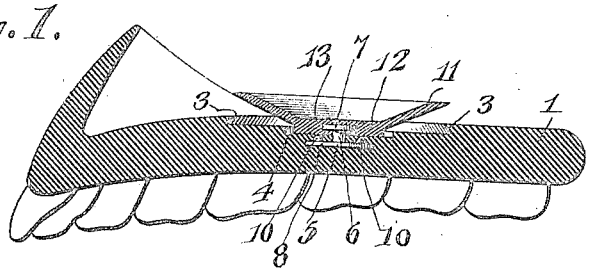
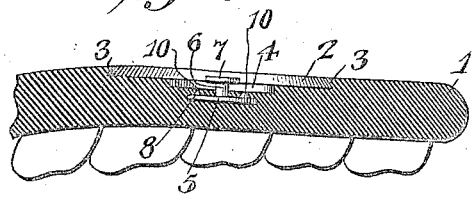
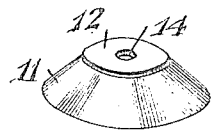
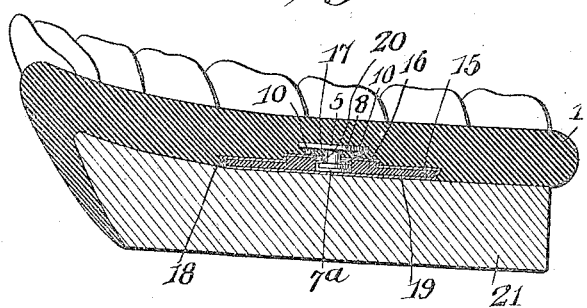
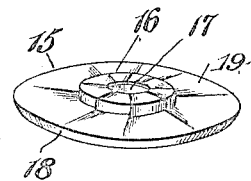
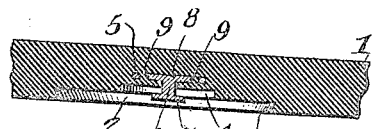
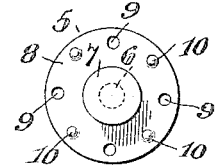
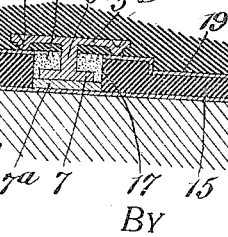
WITNESSES:
Howard D. Orr.
H. T. Chapman.
George S. Whitaker,
INVENTOR,
BY
Attorney

UNITED STATES PATENT OFFICE.

GEORGE SYLVANES WHITAKER, OF WILKES-BARRE, PENNSYLVANIA.

DENTAL RETAINER AND PROCESS OF MAKING SAME.

1,253,654. Specification of Letters Patent. Patented Jan. 15, 1918.

Application filed September 30, 1915. Serial No. 53,322.

*To all whom it may concern:*

Be it known that I, GEORGE S. WHITAKER, a citizen of the United States, residing at Wilkes-Barre, in the county of Luzerne and State of Pennsylvania, have invented a new and useful Denture-Retainer and Processes of Making Same, of which the following is a specification.

This invention has reference to denture retainers and it relates to that type of dental plates formed in the upper or roof-engaging surface with a suction cavity in which a flexible suction device, such as a cup disk, is lodged. The object of the present invention is to provide for the holding of the cup disk firmly in place, but in a manner permitting its ready renewal at will, while the cavity in the plate may be utilized as a vacuum retainer aiding the cup disk in firmly holding the plate to the roof of the mouth.

In accordance with the present invention a soft rubber mold of suitable shape with a bevel edge and a central projection is provided, the mold having a hole or passage centrally through the central projection, and the entire mold is covered with a material such as tin foil, whereby vulcanization of the mold to the plate is prevented. There is also provided a button having a relatively broad base, a thin neck or shank, and a head which may be considerably smaller than the base. The button has its base portion provided with perforations and also with projections on the face of the base portion toward the head, which projections may be formed by stamping the base with a suitable tool. The perforation through the mold is of a size to receive the head of the button with the projections engaging the face of the central projecting portion of the mold and also to receive a thin disk to be engaged by the head of the button, whereby the base of the button is held away from the mold for a short distance. The mold is secured to the cast upon which the plate is to be formed and then the rubber is applied in the usual manner, this resulting in the basic portion of the button becoming embedded in the rubber and anchored therein by small quantities of the rubber flowing over that face of the base provided with the projections and between said projections and the central projection of the mold. The rubber is prevented from flowing into the passage through the mold and about the neck or shank of the button by a suitable compound introduced into the passage through the mold and in which the head and shank of the button are embedded.

After vulcanization of the denture the mold, which is made of soft rubber, is flexible enough to be readily removed leaving the button firmly anchored in the cavity in the plate formed by the mold, which latter insures the proper positioning of the button with respect to the plate.

Now the button receives a cup disk made of soft rubber with a somewhat thickened basic portion in which there is produced a double-floor chamber adapted to receive the head of the button, which chamber has an entrance or mouth portion of a size to hug the shank of the button and yet will expand sufficiently to permit the entrance of the head of the button therethrough. In this way the cup disk is firmly held to the denture in a manner however permitting its ready removal at any time and the substitution of another cup disk. The diameter of the suction cavity is such as to accommodate the cup disk when flattened out while the undercut or beveled edge of the cavity serves as an additional suction means for holding the plate or denture in place. The central projection or boss of the mold causes the central deepening of the cavity of the plate to accommodate the thickened portion of the cup disk, which thickened portion is provided for the reception of the button head so that the latter is covered by a wall interposed between the button head and the roof of the mouth of the user.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a longitudinal vertical section of a set of upper teeth with the button and cup disk or suction device in place.

Fig. 2 is a similar section of a portion of the upper plate with the button in place but with the cup disk removed.

Fig. 3 is an inverted perspective of the cup disk.

Fig. 4 is a longitudinal section of the plate in position on the roof cast with the button and mold in place.

Fig. 5 is a perspective view of the mold.

Fig. 6 is a fragmentary section of the plate shown in Fig. 4 but at right angles to such showing, the roof cast being omitted.

Fig. 7 is a plan view of the button from the head end.

Fig. 8 is a section similar to, but on a larger scale, of a fragment of Fig. 4, to show the structure more plainly.

In the drawings proportions are greatly exaggerated, parts being shown larger than the natural scale and some parts being shown of greatly exaggerated thickness or projection for the sake of clearness of illustration.

Referring to the drawings there is shown a dental plate 1 provided with a socket 2 having an undercut beveled peripheral edge 3 and a central depression 4. Embedded in the plate 1 is the basic end of a button 5 having a shank 6 centrally located with respect to the depression 4 and rising through said depression and terminating within the cavity 2 in a laterally extended head 7. The basic portion of the button 5, indicated at 8, is of greater lateral expansion than the head 7 and is provided with a circular series of perforations 9, with which perforations there are interspersed projections 10 which may be formed by stamping up the metal of the basic portion 8, it being understood that the button is formed of metal of suitable character. The head 7 and basic portion 8 may be very thin, and the neck 6 is of small diameter, while the projections 10 shown as quite pronounced in the drawings are really of small extent. The parts are shown in the drawings proportionally larger than need be in order to avoid a showing of so small a scale as to be unintelligible. As an instance, the projections 10 are of such small extent that when the basic portion of the button is embedded in the body of the plate with the free ends of the projections level with the surface of the bottom of the central depression 4, the amount of rubber covering the basic portion is in the nature of a mere film. The rubber of the plate extends through the perforations 9 and so serves to thoroughly anchor the button without respect to the film of rubber which may cover the upper surface of the basic portion 8.

There is also provided a cup disk 11 of generally frusto-conical form with a thickened base 12 at the small end. The basic portion 12 is of a size to fit within the depression 4 of the cavity 2 and within the basic portion 12 there is formed a chamber 13 to receive the head of the button 7, this chamber being entered by a passage 14 opening through that portion of the base 12 remote from the larger end of the cup disk. The parts are so proportioned that when the head 7 of the button is lodged within the chamber 13 the cup disk is firmly attached to the dental plate 1 with the thickened bottom of the cup disk in engagement with the bottom of the depression 4. The width of the wider portion of the cup disk is such that the latter will flatten down into the cavity 2 with its margin close to the peripheral portion 3, so that the plate is held by the suction produced by the cup disk and additional suction due to the cavity 2 with its undercut edge 3.

In order to produce the cavity 2 with its central depression 4 there is provided a disk-like mold 15 with a central projection 16 through which there is a centrally located hole or perforation 17. The mold 15 has a beveled margin 18 and the entire mold is covered with a layer 19 preferably of tin foil except that at that end of the hole 17 which opens through the projection 16 the tin foil is omitted. The hole 17 is of a size to receive the head 7 of the button 5 and when the protuberances or projections 10 engage the tin foil covering of the projection 16 about the hole 17 the head 7 of the button is close to the tin foil covering 19 where it passes across the opening 17 on the face of the mold 15 remote from the projection 16. While the projections 10 may engage the tin foil 19 and so space the base 8 of the button 5 from the projection 6, this is more certainly performed by a disk 7$^a$ lodged in the hole 17 against the tin foil 19 covering one end of the hole. The thickness of the disk 7$^a$ determines the spacing of the base 8 from the projection 16 and the depth of embedding of the base 8 in the rubber at the bottom of the depression 4. In order to prevent access of the rubber of the plate 1 while being applied and before it is vulcanized, the hole 17 is filled with a suitable composition represented at 20 so as to embed the head 7 and prevent access of the rubber to the stem 6 where it projects in the finished plate from the bottom of the depression 4. This composition may be of any suitable type to which the rubber will not stick or become vulcanized.

The mold 16 is attached to the casting indicated at 21 in Fig. 4 in any appropriate manner, as by means of tacks or the like, with the button 5 in place, and then the material of the plate 1 is applied in the customary manner so as to embed the end 8 of the button and embed the mold 15. The material of the plate 1 is then subjected to vulcanization in the usual manner, after which the plate 1 is removed from the casting 21 and the mold 15 being of soft rubber is readily detached from the plate despite the fact that its beveled edge projects for a distance into the body of the plate. The removal of the mold 15 from the vulcanized plate or denture 1 causes the pulling out of the head 7 of the button 5 from the passage 17 so that the denture is then in the condition represented in Figs. 2 and 6, so far as the cavity 2, depression 4 and button 5 are concerned.

When the cup disk 11 is applied to a plate having the button 5 attached thereto, the button is completely covered, so that at no place can it come into contact with the roof of the mouth of the wearer. Moreover, the cup disk may be removed at any time for cleansing or for repair or to be replaced by another cup disk.

By means of the soft rubber mold for forming the suction cavity or chamber the metal button is properly placed without liability of mistake on the part of the dentist and after vulcanization of the rubber on the plate the metal button is firmly anchored in place. The cup disk is not at all permanently attached to the button, while the latter is firmly and immovably attached to the plate from which it cannot be removed except by the destruction of either the button or the plate. The cup disk, however, while firmly attached to the plate, is readily removable therefrom at will and is as easily replaced. At the same time, no metal whatever comes into contact with any part of the mouth of the user.

The disk 7ª has another important function besides that of determining the depth of embedding the base 8 into the bottom of the depression 4. It also determines the proper spacing of the head of the metal button below the mouth of the socket or cavity 2 so that when the cup disk is applied and the finished plate is in the mouth of the wearer the head of the metal button does not interfere with the firm seating of the plate against the roof of the mouth, for otherwise it would prevent the establishment of the proper suction.

What is claimed is:—

1. A dental plate provided with a suction cavity having a central depression, a button provided with a neck and a laterally expanded head and centrally anchored in the depression with its head exposed within the suction cavity, and a cup disk with a chamber formed in the bottom of the cup and provided with an entering passage for receiving the exposed head and neck of the button after said button has been anchored in the plate, said chamber being wholly closed by the material of the cup on the side of the latter presented toward the roof of the mouth of the user when the dental plate is in place.

2. A dental plate provided with a suction cavity having a button with a head at one end and an expanded basic portion at the other end with said expanded basic portion provided with protuberances directed toward the head portion and also with perforations, said basic portion being embedded in the material of the plate to a depth determined by the projection of the protuberances, and a suction cup having a chamber adapted to receive and inclose the head and exposed portion of the shank of the button.

3. The process of making dental plates, which consists in forming a cast, applying a mold with a central perforation to the impression face of the cast, with the mold having a metal button thereon and said button having a head lodged within the perforation in the mold and a basic portion exterior thereto, molding a plate on the cast over the mold with the basic portion of the button embedded in the plate, and then vulcanizing the plate.

4. The process of making dental plates, which consists in forming a cast, securing a suction-cavity-forming mold to the impression face of the cast with the mold inclosed in a non-adhesive coating, said mold having a central perforation and a metal button applied to the mold with the head of the button inclosed in the perforation, and said button having a basic portion spaced from the corresponding face of the mold, forming a plate on the cast and mold, and vulcanizing the plate with the basic portion of the button embedded in the plate to an extent determined by the spacing of the basic portion of the plate from the mold.

5. The process of making dental plates, which consists in providing a cast and a cavity-producing mold for attachment to the cast, said mold having a beveled edge and a central projection, and also being centrally perforated, inclosing the mold in non-vulcanizable material, housing a disk in the perforation in the mold at the end of the perforation remote from the central projection on the mold, applying a metal button having a head at one end and an expanded basic portion at the other end to the mold with the head lodged in the perforation against the disk, molding the body of the plate against a cast and mold attached thereto with the basic portion of the button embedded in the body of the plate to an extent determined by the disk, then vulcanizing the body of the plate to thereby anchor the button to the plate, and finally removing the vulcanized plate and the button fast thereto from the cast and mold.

In testimony, that I claim the foregoing as my own, I have hereto affixed my signature in the presence of two witnesses.

GEORGE SYLVANES WHITAKER.

Witnesses:
FRANK P. SLATTERY,
J. L. SAUERMILCH.